United States Patent
Tang et al.

(10) Patent No.: US 10,740,251 B2
(45) Date of Patent: Aug. 11, 2020

(54) HYBRID DRIVE TRANSLATION LAYER

(71) Applicant: Seagate Technology LLC, Cupertino, CA (US)

(72) Inventors: Alex Tang, Cupertino, CA (US);
Leonid Baryudin, San Jose, CA (US);
Timothy Canepa, Los Gatos, CA (US);
Jackson Ellis, Fort Collins, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 15/411,679

(22) Filed: Jan. 20, 2017

(65) Prior Publication Data

US 2018/0210832 A1 Jul. 26, 2018

(51) Int. Cl.
*G06F 12/128* (2016.01)
*G06F 12/02* (2006.01)
*G06F 12/0868* (2016.01)
*G06F 12/0888* (2016.01)

(52) U.S. Cl.
CPC ........ *G06F 12/128* (2013.01); *G06F 12/0246* (2013.01); *G06F 12/0292* (2013.01); *G06F 12/0868* (2013.01); *G06F 12/0888* (2013.01); *G06F 2212/217* (2013.01); *G06F 2212/222* (2013.01); *G06F 2212/7201* (2013.01); *G06F 2212/7205* (2013.01)

(58) Field of Classification Search
CPC .... G06F 12/0808; G06F 12/128; G06F 3/061; G06F 3/0655; G06F 3/0679; G06F 3/0685; G06F 2212/621; G06F 12/0246; G06F 12/0292; G06F 12/0868; G06F 12/0888; G06F 2212/217; G06F 2212/7205; G06F 2212/7201; G06F 2212/222
See application file for complete search history.

(56) References Cited

U.S. PATENT DOCUMENTS

| | | | |
|---|---|---|---|
| 8,312,219 B2 | 11/2012 | Cher et al. | |
| 8,341,339 B1 | 12/2012 | Boyle et al. | |
| 8,700,949 B2 | 4/2014 | Eleftheriou et al. | |
| 8,719,501 B2* | 5/2014 | Flynn .................. | G06F 12/0246 711/103 |
| 8,838,936 B1 | 9/2014 | Salessi et al. | |
| 8,966,205 B1 | 2/2015 | Lo et al. | |
| 9,218,281 B2* | 12/2015 | Cohen ................. | G06F 12/0246 |
| 10,210,084 B1* | 2/2019 | Bruce ................. | G06F 12/0811 |

(Continued)

*Primary Examiner* — David Yi
*Assistant Examiner* — Alan Otto
(74) *Attorney, Agent, or Firm* — Holzer Patel Drennan

(57) ABSTRACT

The implementations described herein provide a hybrid drive with a storage capacity including solid-state drive (NAND) technology and hard disc drive (HDD) technology. A translation layer is stored in the solid-state drive and includes plurality of entries. Each entry of the plurality of entries corresponds to at least one logical data unit and includes a cache state indicating where the data corresponding to the logical data unit is located and whether the data is valid. The translation layer may be a multi-layer map that includes a sparse mapping scheme. In a sparse multi-layer map, entries are leaf entries or non-leaf entries. Leaf entries include a cache state for the corresponding logical data unit(s). Non-leaf entries may include a pointer to a lower level mapping for a plurality of logical data units.

20 Claims, 6 Drawing Sheets

(56) References Cited

U.S. PATENT DOCUMENTS

| | | | |
|---|---|---|---|
| 2007/0288692 A1* | 12/2007 | Bruce | G06F 3/061 |
| | | | 711/113 |
| 2013/0238832 A1* | 9/2013 | Dronamraju | G06F 3/0608 |
| | | | 711/103 |
| 2014/0115238 A1 | 4/2014 | Xi et al. | |
| 2014/0122774 A1 | 5/2014 | Xian et al. | |
| 2015/0058525 A1 | 2/2015 | Venkata | |
| 2016/0299715 A1 | 10/2016 | Hashimoto et al. | |

* cited by examiner

HYBRID DRIVE TRANSLATION LAYER

CROSS REFERENCE TO RELATED APPLICATIONS

This application is related to U.S. patent application Ser. No. 15/411,550, titled, "Hybrid Drive Garbage Collection" and filed 20 Jan. 2017, which is specifically incorporated by reference herein for all that it discloses and teaches.

BACKGROUND

Hybrid drives may incorporate hard disc drive (HDD) and solid-state drive (SSD) technology. The SSD of the hybrid drive may use NAND memory as a cache for the HDD. The capacity of the NAND is small compared to the overall drive capacity and thus is typically used as a persistent (e.g., survives a power failure) cache to the HDD. The NAND is managed like a SSD device and utilizes a flash translation layer (FTL) to map logical data units to physical locations in the NAND memory. The FTL is generally sized to map the NAND capacity. As the NAND space and HDD space are separate, a cache layer may utilize a separate mapping scheme to map SSD logical data units to space to HDD logical data units.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

A hybrid drive includes a storage capacity that includes solid-state media and hard disc media. The hybrid drive further includes a translation layer stored in the solid-state media. The translation layer maps the storage capacity and includes a plurality of entries. Each entry of the plurality of entries corresponds to at least one logical data unit and include a cache state that indicates the status of data corresponding to the at least one logical data unit.

These and various other features and advantages will be apparent from a reading of the following Detailed Description.

BRIEF DESCRIPTIONS OF THE DRAWINGS

DETAILED DESCRIPTION

Figure 1:
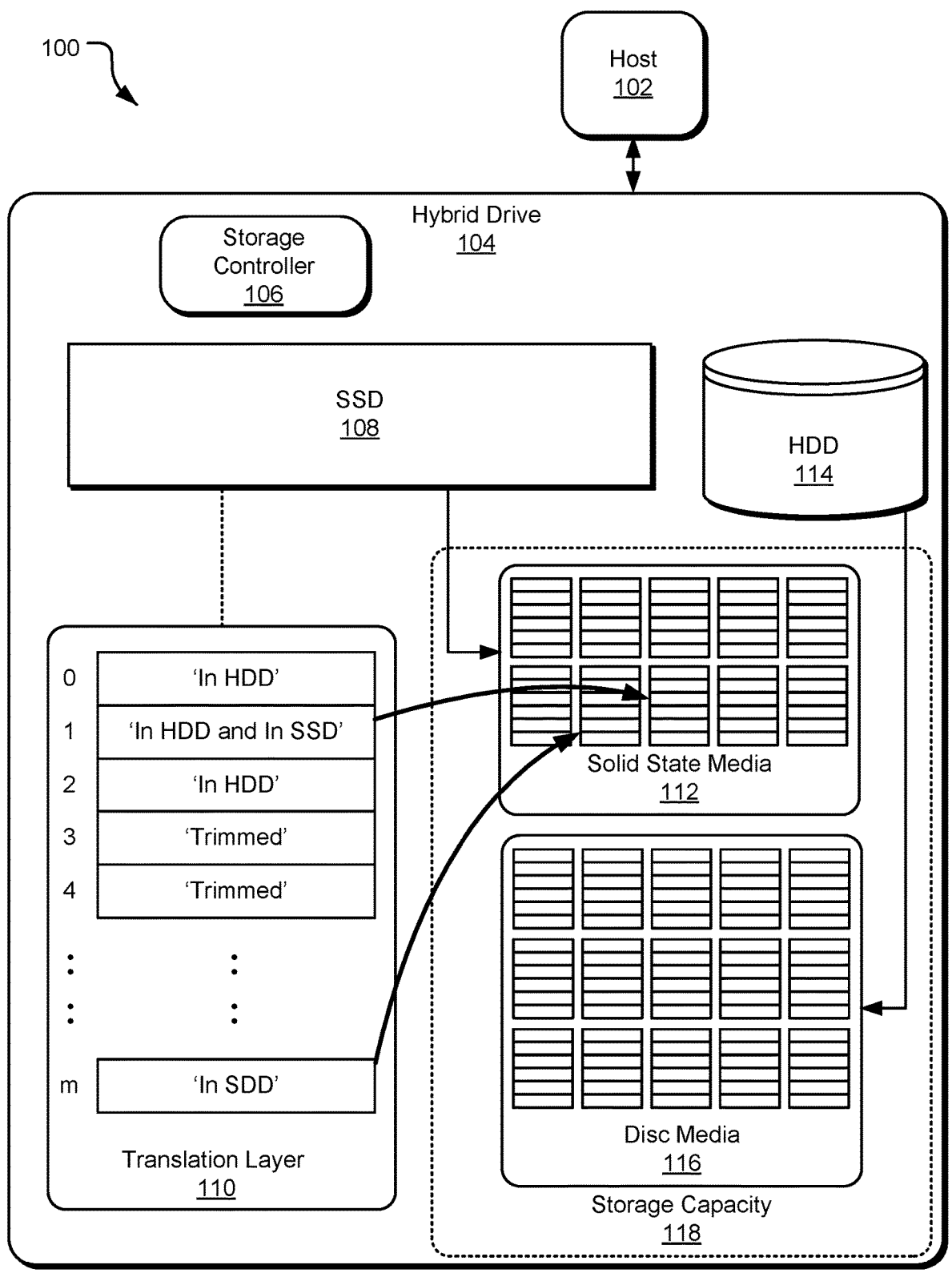
FIG. 1 illustrates a block diagram of an example hybrid drive with a translation layer.

A hybrid drive storage device may utilize technology of one or more hard disk drives (HDDs) (e.g., having rotating magnetic or optical media), and one or more solid-state drive (SSDs) that may be used as cache space. The HDD of a hybrid drive includes cheap and high capacity storage media for storing data for extended periods of time due to high read/write latency compared to the SSD caches. SSDs are generally fast access and as such the SSDs of the hybrid drive are used to hold cache data, data that is frequency/recently accessed, or important data (e.g., boot data). As such, hybrid drives are also referred to as solid-state hybrid drives (SSHDs), because they combine HDD technology and SSD technology to leverage advantages of cost and speed.

An SSD utilizes a flash translation layer (FTL) to map logical data units to a physical data location in NAND memory. The map is generally sized to map the NAND capacity. A hybrid drive incorporating both NAND flash and HDD memory, forming a NAND space and an HDD space, utilizes a caching layer that may be incorporated into or made separate from the FTL. The cache layer determines what data is stored in the NAND cache, with the cache layer and FTL sized to map the NAND capacity. As the cache layer is outside of the FTL, a journaling or other scheme is used to ensure the cache layer map is persistent.

Implementations described herein provide a translation layer for a hybrid drive that includes a unified map used to track the location of both HDD and SSD data. In other words, the translation layer may map a storage capacity greater than that of the NAND capacity in terms of logical data units. The map includes a number of "leaf entries." Each leaf entry in the map contains a "cache state" where the cache state indicates the location where data corresponding to the logical data unit(s) corresponding to the leaf entry is stored and/or valid. In various embodiments, the map can have one or more levels, and a leaf entry may be present at any level of the map. At the lowest level of the map, a leaf entry represents the location and cache state of a logical data unit. At high levels of the map, a leaf entry represents the location and cache state of a plurality of logical data units.

The cache states of the map indicate status of the data corresponding to the logical data unit(s) corresponding to the associated entry. For example, the cache state may indicate that data corresponding to the logical data unit(s) is located in the HDD, the SSD, or both in the HDD or SSD. Furthermore, the cache state may indicate that data is trimmed (e.g., invalid) or that the data is being flushed from the SSD to the HDD. The cache states may be utilized by the cache layer to enhance performance characteristics of the hybrid drive. For example, the cache layer may select a plurality of consecutive logical data units for demotion from the SSD to the HDD based on the cache states included in the translation layer. Demotion is a process of moving data from the SSD cache to the HDD, which may be based on access priority of data. For example, data that is recently/frequently accessed may be stored in the SSD, and infrequently accessed data that is currently in the SSD may be selected for demotion to the HDD.

In multi-level map embodiments, the map may use a "sparse" mapping scheme. In a sparse mapping scheme, upper level maps include a plurality of entries. Each entry corresponds to a plurality of logical data units. If an entry in an upper level map is a "leaf entry," then the cache state indicates a location of the data corresponding to the plurality of logical data units (e.g., HDD). If an entry is a non-leaf entry, then the cache state includes a pointer to a lower level map (e.g., a lower level map page) that includes a plurality of entries. Each entry in the lower level map may correspond to a plurality of logical data units, as described with respect to the upper level map. In the lowest level map, each entry is a leaf entry that corresponds to a logical data unit. The cache state in the lowest level map indicates a location of the data corresponding to the logical data unit.

FIG. 1 illustrates a block diagram 100 of an example hybrid drive 104 with a translation layer 110. The hybrid drive 104 is communicatively connected to a host 102. The host 102 transmits data access commands (e.g., read, write, and/or trim commands) to the hybrid drive 104. As illustrated, the hybrid drive 104 is external to the host 102. In an alternative implementation, the hybrid drive 104 may be internal to the host 102.

The hybrid drive 104 includes both solid-state storage media (in a SSD 108) and disc media (e.g., in a HDD 114). The SSD 108 may be used as (and is therefore referred to as) a cache. The HDD 114 provides high capacity storage media for the hybrid drive 104 and may include one or more discs (magnetic and/or optical) for storing data. The SSD 108 may incorporate NAND or other forms of non-volatile memory technology to store data and acts as a read/write cache to the HDD 114. Such read/write data may include frequently or recently accessed data as well as recently received data (e.g., from the host 102). Such data may be referred to as 'hot' data. Data stored on the SSD 108 may also include boot data or data awaiting transfer to the HDD 114. It should be understood that the hybrid drive 104 may include multiple SSDs 108 and/or multiple HDDs 114.

The hybrid drive 104 further includes a storage controller 106, which may include instructions stored on a storage media and executed by a processor (not shown) to receive and process data access commands from the host 102. It should be understood that the hybrid drive 104 may include one or more storage controllers for executing different functions on the hybrid drive 104. For example, the SSD 108 may include a separate storage controller for caching, mapping, and garbage collection, and translation layer 110 management. Similarly, the HDD 114 may include a storage controller for accessing data stored on one or more discs of the HDD 114.

The translation layer 110 of the SSD 108 is used to map a number of logical data units to a storage capacity. In implementations, the storage capacity includes some or all available space of the SSD 108 and some or all of the available space of the HDD 114. Available space includes space that may be used for host data. As such, in implementations, the "storage capacity" may be the capacity (e.g., logical capacity) that is presented to the host. A typical logical data unit may be 4k bytes in size but may be smaller or larger depending on the implementation. The translation layer 110 includes a plurality of entries (e.g., entries 0 to m) representing logical data units. Each entry of the plurality of entries corresponds to a logical data unit of the storage capacity. Each entry in FIG. 1 is a "leaf entry," in that each entry is augmented with cache states and, in some implementations, other information. As illustrated in FIG. 1, the translation layer 110 is a single level map, but multi-level maps are contemplated and illustrated below with respect to the following figures. In multi-level maps, upper levels of the map contain a cache state that indicates the state for the entire region mapped by that upper level entry. The cache state of the upper level map indicates that the region is either on HDD, trimmed, or mapped by lower levels of the map (e.g., the region has a corresponding second level map page). Because cache data (in the SSD 108) is stored in non-volatile memory (solid-state NAND or DRAM), the cached data is persistent across power cycles. Thus, the translation layer 110 is persistently managed.

The cache state of each logical data unit may be 'In SSD,' 'In HDD,' 'In SSD and In HDD' (or 'In Both'). As such, the cache states represent where data corresponding to the logical data unit is located. In other words, the cache state represents where data corresponding to the logical data unit is valid (e.g., not stale). For example, the logical data unit 0 is located in the HDD 114, as shown by the cache state 'In HDD.' Entries including cache states that the corresponding data is located in the solid-state media 112 (e.g., the cache) may include pointers to the location on the solid-state media 112 where the data of the logical data unit is located. For example, a logical data unit 1 corresponds to data that is located in both the HDD 114 and on the SSD 108, as represented by the cache state 'In HDD and In SSD.' The logical data unit 1 further includes a pointer to a physical location on the solid-state media 112 where the data is located. In another example, logical data unit m includes a cache state that indicates that the corresponding data is located in the SSD only. Thus, entry m includes a pointer to another physical location on the solid-state media where data corresponding to the logical data unit m is located. An entry that has cache states indicating that data associated with the entry is valid in the HDD (e.g., 'In HDD' or 'In Both') may further include mapping information to HDD space. Such mapping information may include a range of logical block addresses (LBAs) for the data in the HDD space.

Furthermore, the cache state of a logical data unit may be 'Trimmed' or 'Flushing to the HDD.' A logical data unit that is 'Trimmed' indicates that no valid host data is located at the location. A read command to a trimmed logical data unit may return a default value. Logical data unit 3 is 'Trimmed' and the data stored in the location represented by the logical data unit 3 is invalid. For example, in a new drive where no host data has been written, a given logical data unit may be considered trimmed (invalid) until it is written. In another example, the host can issue trim requests to the drive to invalidate one or more logical data units, which may occur when the file system deletes unneeded files or partitions. A logical data unit may have the state 'Flushing to the HDD' when the data represented by the logical data unit is in the process of being demoted to the HDD. Data may be demoted from the cache (e.g., SSD 108) as a result of the data being cold. It should be understood that the cache states may be represented by characters or numbers. For example, an entry having a cache state of '1' may represent: 'In SSD.' An entry having a cache state of '2' may represent: 'In SSD and In HDD,' etc.

The cache state for a logical data unit may change/transition when a certain activity affects the corresponding logical data unit. Example activities that can affect the cache state include a cache promote, cache demote, host write, host trim, and garbage collection. The translation layer 110 (via a translation layer 110 storage controller) handles a change in the cache state by updating the respective map entries. A cache promote occurs when data is moved from the HDD 114 to the SSD 108. A cache demote occurs when data stored in the SSD 108 becomes cold. The cache layer (e.g., the cache algorithm) processes cold data by copying the data from the SSD 108 (cache) to the HDD 114. A host trim invalidates data, and garbage collection reads valid logical data units from a block of NAND memory and rewrites them to another block that was previously erased (e.g., in the SSD 108). The translation layer 110 may follow procedures to ensure that the map is persistent and coherent.

A garbage collection process may utilize the state information in the translation layer 110 to determine whether to rewrite the data to another location in the SSD. For example, if the garbage collection process encounters data that is 'In SSD and In HDD' and determines that the data is cold, the garbage collection process may decide to not rewrite (e.g., garbage collect) the data and update the cache state in the translation layer 110 to 'In HDD' only. As such, the space occupied by the data may be utilized for other data. Similarly, if the garbage collection process encounters data that is 'In SSD' (using the translation layer 110) and determines that the data is cold, then the garbage collection process may initiate demotion of the data to the HDD and update the cache state in the translation layer 110.

Because the translation layer 110 maps the host storage capacity 118 (e.g., the solid-state media 112 and the disc media 116), the HDD mapping information is not included with each entry. In other words, the translation layer 110 covers all logical data unit space (e.g., the host storage capacity). As such, the translation layer covers 0 to m logical data units. For a host write, the host write address is directly translation to one or more logical data units and the corresponding entries in the translation layer 110. Since the smallest mapping unit of the translation layer 110 is one logical data unit, the translation layer 110 can track the cache state (e.g., location of the data) in this granularity.

Figure 2:
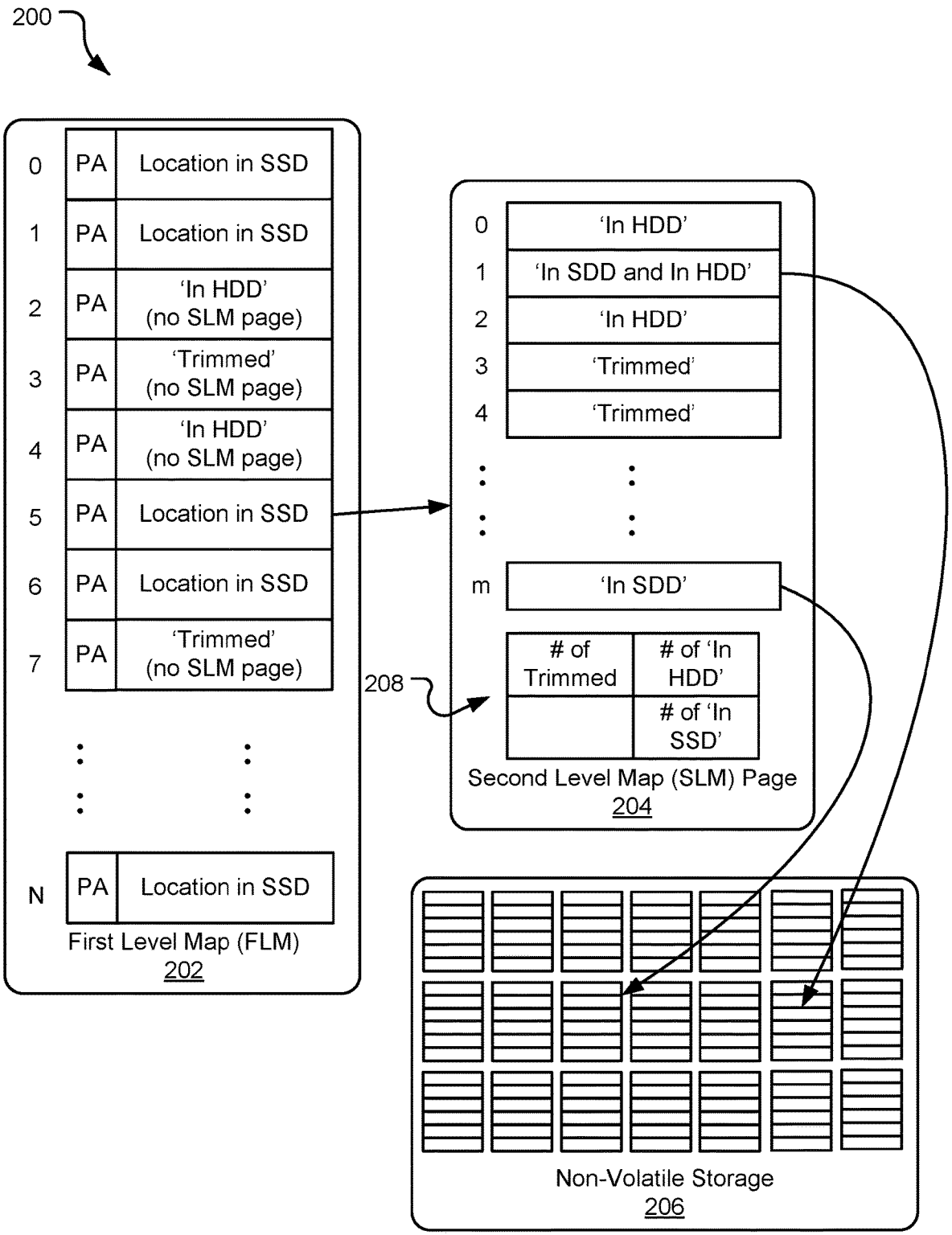
FIG. 2 illustrates a block diagram of an example flash translation layer mapping scheme.

FIG. 2 illustrates a block diagram of an example translation layer mapping scheme 200 in a hybrid drive. Specifically, the translation layer mapping scheme 200 is a two-level mapping scheme that includes a first level map 202, a second level map page 204, and non-volatile storage 206. In some implementations, the non-volatile storage 206 is the solid-state storage media of a SSD (not shown) of the hybrid drive.

The first level map 202 includes a plurality of entries (e.g., entries 0 to N). Each entry corresponds to a plurality of logical data units, and each entry is either a "leaf entry" or a "non-leaf" entry. A leaf entry, such as entry 2, is a terminating entry, which means that there is no lower level mapping for the logical data units corresponding to the leaf entry. A leaf entry includes a cache state, which indicates the location (or status) of the logical data unit(s) corresponding to the entry. For example, leaf entry 2 has a cache state of 'In HDD,' which indicates that data corresponding to all logical data units corresponding to entry 2 are located in the HDD. This is an example of the "sparse mapping" scheme of a multi-level translation layer. A rule is enforced to keep the size of the second level map stored in the media (SSD) reasonable. For example, a second level map page is not included (e.g., stored in NAND) for leaf entry 2, because the leaf entry 2 can fully describe both the location and the state of the media (e.g., data). Thus, when all logical data units corresponding to an upper level map (e.g., the first level map 202) have data that is located in the HDD only, then lower level mapping is not included for such logical data units.

A non-leaf entry of the first level map 202 is a non-terminating entry. A non-leaf entry may be considered a branch. For example, entry 5 of the first level map 202 is a non-leaf entry. A non-leaf entry includes a pointer to a location in the SSD where the lower level map for the plurality of logical data units corresponding to the non-leaf entry is located. Logical data units 0 to m (of the second level map page 204) correspond to entry 5. Thus, entry 5 includes a pointer to the second level map page 202 where the logical data units 0 to m are represented. The second level map page 204 is included for entry 5 because the logical data units 0 to m have varying cache states. Each entry in the second level map page 204 is a leaf entry. As such each entry of the second level map page 204 includes a cache state. For example, entry 0 has a cache state of 'In HDD,' which indicates that the corresponding logical data unit is located (e.g., valid) in the HDD. Any entry that has a cache state that indicates that the data of the logical data unit is located in the SSD (e.g., cache states 'In SSD' or 'In SSD and In HDD') further includes a pointer to the location on the non-volatile storage 206 where the data is located. In some implementations, the cache state may be 'Flushing to HDD' or 'Trimmed.'

The second level map page 204 further includes page state information 208 which includes parameters indicating the cache state information for logical data units corresponding with various entries of the second level map page 204. The page state information 208 may include counts for each type of cache state of the second level map page 204. For example, if the second level map page 204 includes five entries that indicate that the logical data units are located in the SSD (e.g., having a cache state of 'in SSD'), then the page state information 208 indicates that five entries have logical data units with data valid in the SSD. A caching algorithm or garbage collection process of the hybrid drive may utilize this information to determine whether to process the data associated with the entries of the second level map page 204. Other information may also be included in the page state information 208.

Each first level map 202 entry may further include page attributes (PA) that can describe which combinations of types or attributes of logical data units exists within the second level map page. The attributes may include parameters indicating page state information 208 of a corresponding second level map page. For example, the page attribute for entry 5 on the first level map 202 may include parameters indicating page state information 208 of second level map page 204. By having the page attributes in the first level map 202 entries, reading or loading the corresponding second level map page may be avoided in some cases. Furthermore, a caching algorithm may utilize the page attributes to select which logical data units to process (e.g., demote), without loading the second level map page from non-volatile storage and examining the second level map page itself.

In some implementations, when a second level map is employed, the second level map pages are stored in the NAND cache. The SSD updates/writes to the translation layer in second level map page units. This means that the SSD is unable to update a second level map entry without updating the second level map page. As such, if the second level map page is not resident, then the whole page is loaded. In some implementations, the second level map page may be resident in DRAM (e.g., DDR SDRAM) or other volatile memory in the SSD of the hybrid drive, allowing the second level map page to be quickly updated. Because each second level map page is written/read as a single unit, the first level map is used to map the physical locations of the second level map pages.

Figure 3:
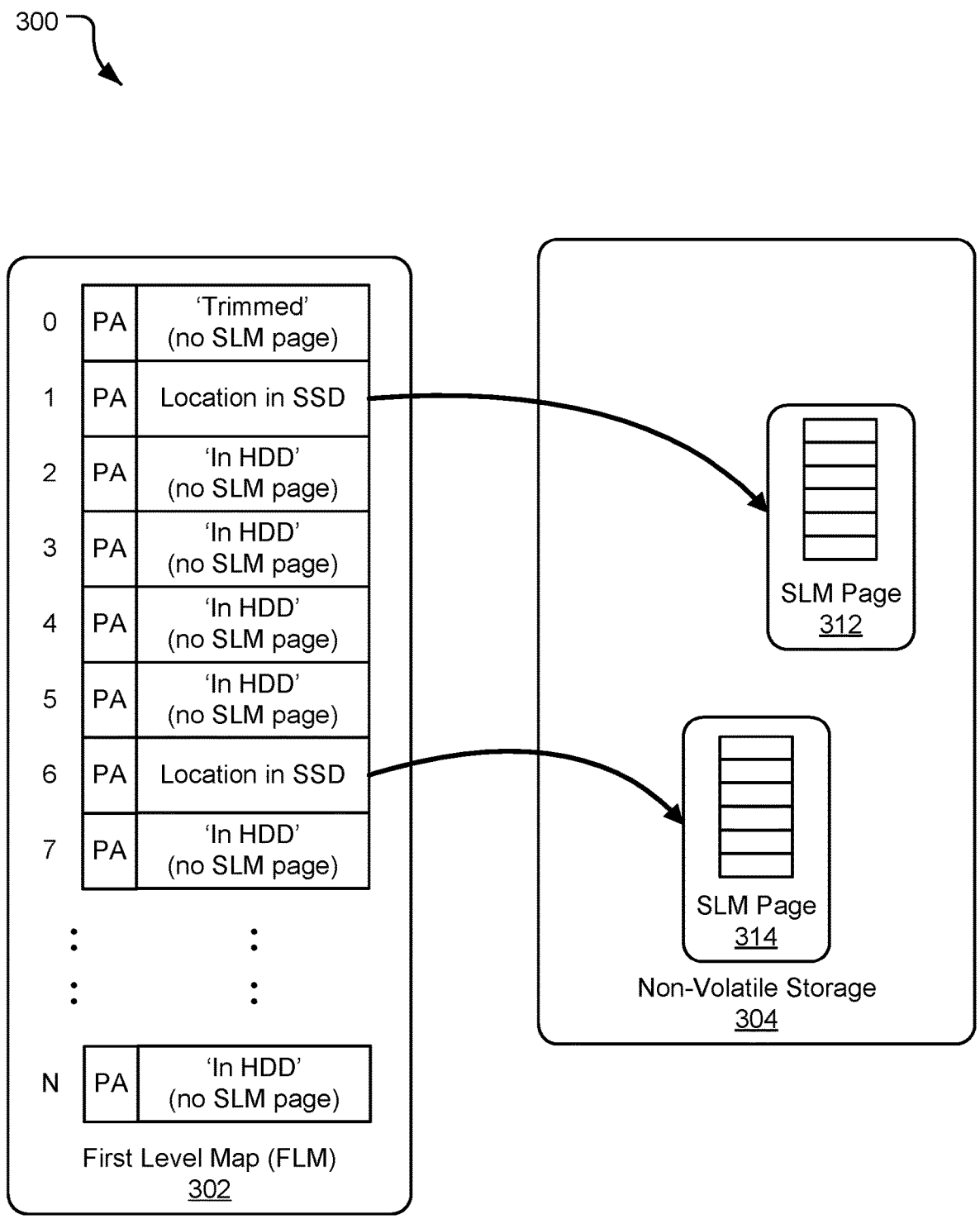
FIG. 3 illustrates a block diagram of another example translation layer mapping scheme.

FIG. 3 illustrates a block diagram of another example translation layer mapping scheme 300. Specifically, FIG. 3 further illustrates the idea of sparse mapping in a translation layer. The translation layer mapping scheme 300 includes a first level map 302 and non-volatile storage 304. It should be understood that the first level map 302 is stored in the non-volatile storage 304, and the non-volatile storage 304 may be the storage media of a SSD of a hybrid drive. The first level map 302 includes an array of entries (e.g., entries 0 to N). Each entry in the first level map 302 corresponds to a number of logical data units. Further, each entry in the first level map 302 may be a leaf entry or a non-leaf entry. Entries 0, 2, 3, etc. are leaf entries because the entries do not include a corresponding lower level map (e.g., a second level map page) for the plurality of logical data units that correspond to the entry. As such, the leaf entries include a cache state that indicates the location (or status) for the logical data units corresponding to the entry. For example, the leaf entry 0 has a cache state of 'Trimmed,' which indicates that the data of the logical data units corresponding to entry 0 is invalid. Entry 2 has a cache state of 'In HDD,' which indicates that the data corresponding to the logical data units corresponding to entry 2 is located in the HDD. Entries that are leaf entries do not have corresponding second level map pages stored in the non-volatile storage 304, because the first level entry is sufficient to describe the location and state of the media. Thus, the mapping scheme 300 is a sparse mapping scheme.

Entries that are non-leaf entries include pointers to a second level map page stored in the non-volatile storage 304. For example, non-leaf entry 1 includes a pointer to the second level map page 312. A plurality of logical data units corresponding to entry 1 are listed in the second level map page 314. Similarly, first level map 302 non-leaf entry 6 includes a pointer to the location on the non-volatile storage 304 where a second level map page 312 is located. The second level map pages 312 and 314 may be bottom level map pages, meaning that each entry in the second level map pages 312 and 314 are leaf entries that correspond to a logical data unit. In other implementations, such as a three-level implementation, each entry of the second level map pages 312 and 314 may correspond to a plurality of logical data units. Thus, the entries of the second level map pages 312 and 314 may be leaf entries or non-leaf entries. The sparse mapping scheme is extended to a multi-level map (greater than two levels). The top level of a multi-level map is equivalent to the first level map in the two-level map scheme. Each of the subsequent levels may be organized into pages. The entries in each of the levels point to physical locations of the pages of the next level down until the bottom most level. At any upper level, if an entry's corresponding logical data units are located in the HDD only, then a lower level page is not included for such logical data units.

In implementations that enforce sparse mapping and map a large portion of the HDD space, most logical data units have a cache state indicating that the data is valid in the HDD only (e.g., 'In HDD'), because the HDD space is larger than the SSD space. Enforcement of the sparse mapping scheme can save a significant amount of space in the SSD because the map itself does not take up significant space. As a result, the majority of the logical data unit's cache states will be represented in the first level map.

Figure 4:
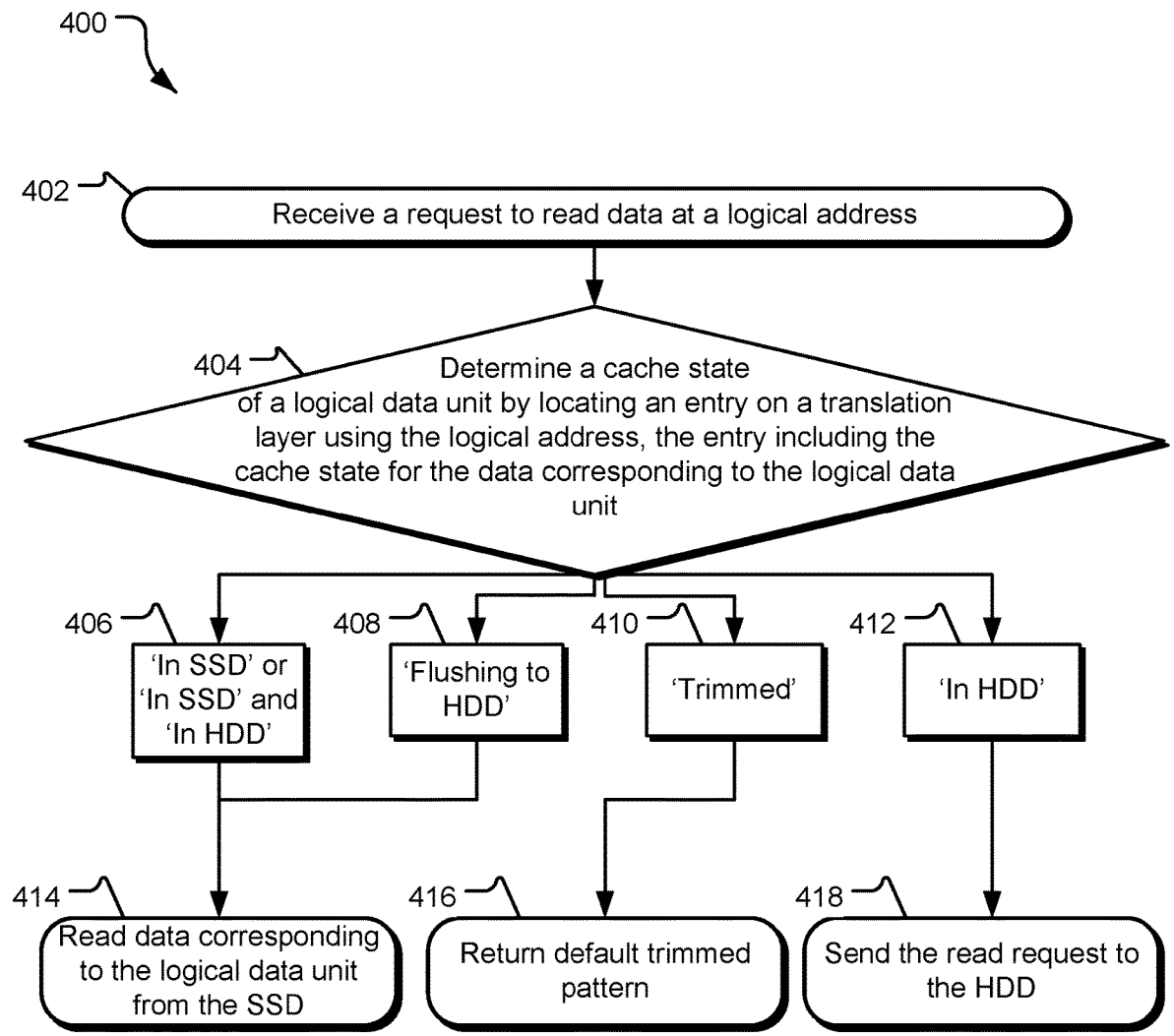
FIG. 4 illustrates example operations for utilizing a translation layer.

FIG. 4 illustrates example operations 400 for utilizing a translation layer. Specifically, FIG. 4 illustrates the operations 400 for utilizing a single-level mapping scheme translation layer on a hybrid drive. A receiving operation 402 receives a request to read data at a logical address. It should be understood that similar operations may be used for a request to write data at a logical address. Thus, the receiving operation 402 may receive a request to write data at a logical address. The request may be received from a host, such that the host requests a host logical block address (LBA). In response to the receiving operation 402, a determining operation 404 determines a cache state of a logical data unit by locating an entry on the translation layer using the logical address. The entry includes the cache state for the logical data unit.

The determined cache state may be 'In SSD' 406 (or both 'In SSD' and 'In HDD'), 'Flushing to HDD' 408, 'Trimmed' 410, or 'In HDD' 412. If the determined cache state is 'In SSD' 406 (or both 'In SSD' and 'In HDD'), then the data corresponding to the logical data unit corresponding to the entry is located (e.g., valid) in the SSD, and a reading operation 412 reads the data corresponding to the logical data unit from the SSD. If the determined cache state is 'Flushing to the HDD,' then the reading operation 414 reads the data corresponding to the logical data unit from the SSD. When data corresponding to a logical data unit is being flushed to the HDD, then the data is serviceable from the SSD while the data is being flushed. If the cache state is 'Trimmed' 410, then a returning operation 416 returns a default trimmed pattern (e.g., all 0s). When the cache state is 'Trimmed' 410 the hybrid drive controller can return the default trimmed pattern without reading from the SSD or HDD. If the cache state is 'In HDD' 412, then a sending operation 418 sends the read request to the HDD. The data corresponding to the logical data unit is read from the HDD. In the case of a request for a write operation, a writing operation would write data to a logical data unit in the SSD, in case of state 406 or 408. If the state is trimmed 410, then the data would be written to a logical data unit in the SSD. If the state is 'In HDD' 412, then the data may be written to the SSD, and the state updated, or the data may be written directly to the HDD.

Figure 5:
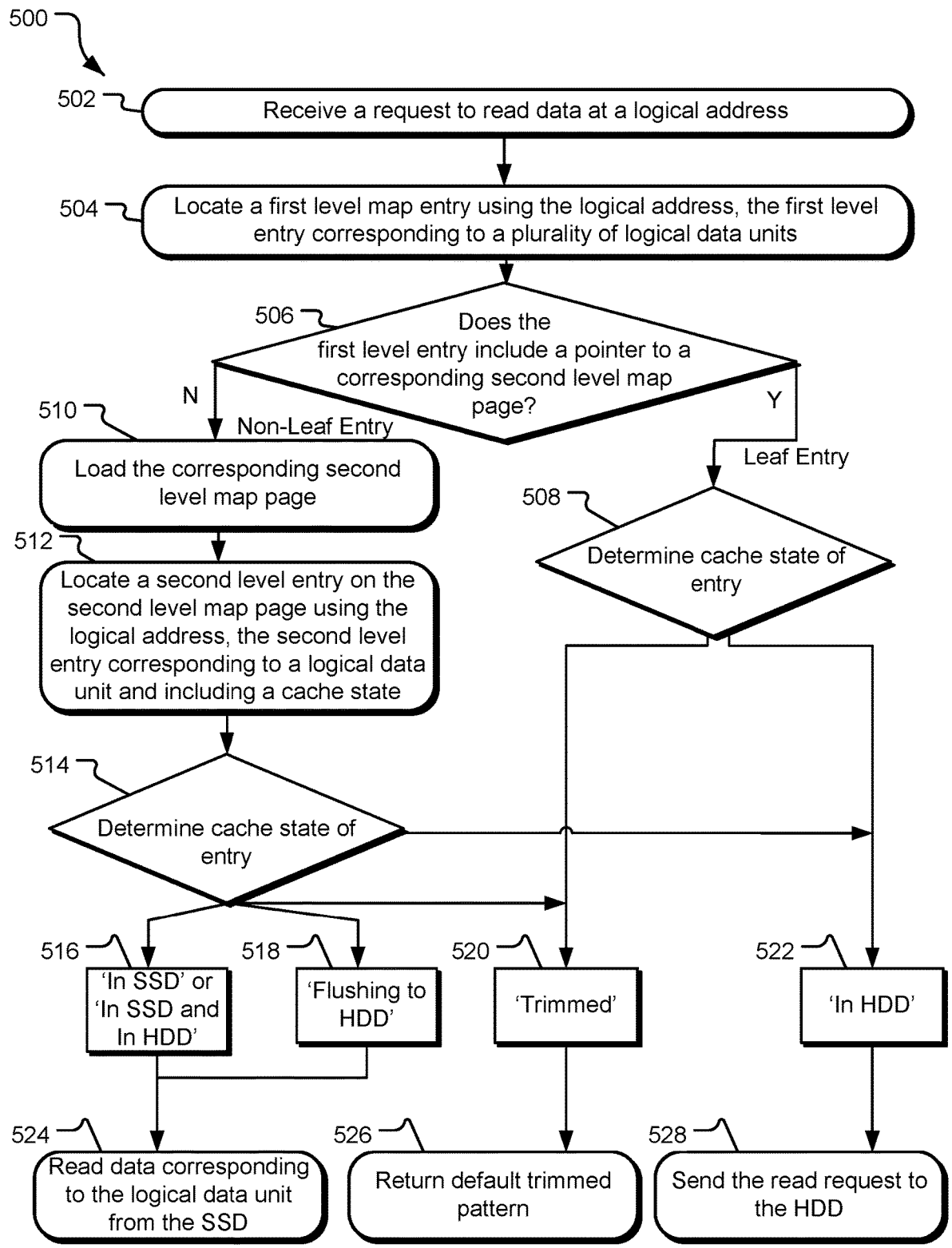
FIG. 5 illustrates alternative example operations for utilizing a translation layer.

FIG. 5 illustrates alternative example operations 500 for utilizing a translation layer. Specifically, FIG. 5 illustrates the operations 500 for utilizing a multi-level mapping scheme translation layer on a hybrid drive. A receiving operation 502 receives a request to red data at a logical address. It should be understood that similar operations may be used for a request to write data at a logical address. Thus, the receiving operation 502 may receive a request to write data at a logical address. A locating operation 504 locates a first level map entry using the logical address. The first level entry corresponds to a plurality of logical data units. After locating the entry that corresponds to the logical address, a determining operation 506 determines whether the located first level entry includes a pointer to a corresponding second level map page (e.g., determines whether the entry is a leaf entry or a non-leaf entry). If the located entry does not include a pointer to a corresponding second level map page (e.g., the entry is a leaf entry), then a determining operation 508 determines the cache state of the entry. If the determined cache state is 'Trimmed' 520, then a returning operation 526 returns a default trimmed pattern. If the determining operation 508 determines that the cache state is 'In HDD' 522, then a sending operation 528 sends the read request to the HDD.

If the determining operation 506 determines that the first level entry includes a pointer to a corresponding second level map page (e.g., a non-leaf entry), then loading operation 510 loads the corresponding second level map page. The second level map page may be loaded from the solid-state media of the SSD of the hybrid drive or from other non-volatile or volatile DRAM (e.g., DDR SDRAM) memory. A second locating operation 512 locates a second level entry on the second level map page using the logical address. The second level entry corresponds to a logical data unit and includes a cache state. In a determining operation 514, a cache state of the entry is determined. Such a cache state may include 'In SSD' or 'In SSD and In HDD' 516, 'Flushing to HDD' 518, 'Trimmed' 520 or 'In HDD' 522. If it is determined that the cache state is 'In SSD' or 'In SSD and 'In HDD' 516, then a reading operation 524 reads data corresponding to the logical data unit from the SSD. If it is determined that the cache state is 'Flushing to the HDD' 518, then the reading operation 524 reads the data corresponding to the logical data unit from the SSD. If it is determined that the cache state is 'Trimmed' 520, then a returning operation 526 returns a default trimmed pattern. If it is determined that the cache state is 'In HDD' 522, then the sending operation 528 sends the read request to the HDD. An index/address of the entry may directly translate to the logical block address on the HDD.

Figure 6:
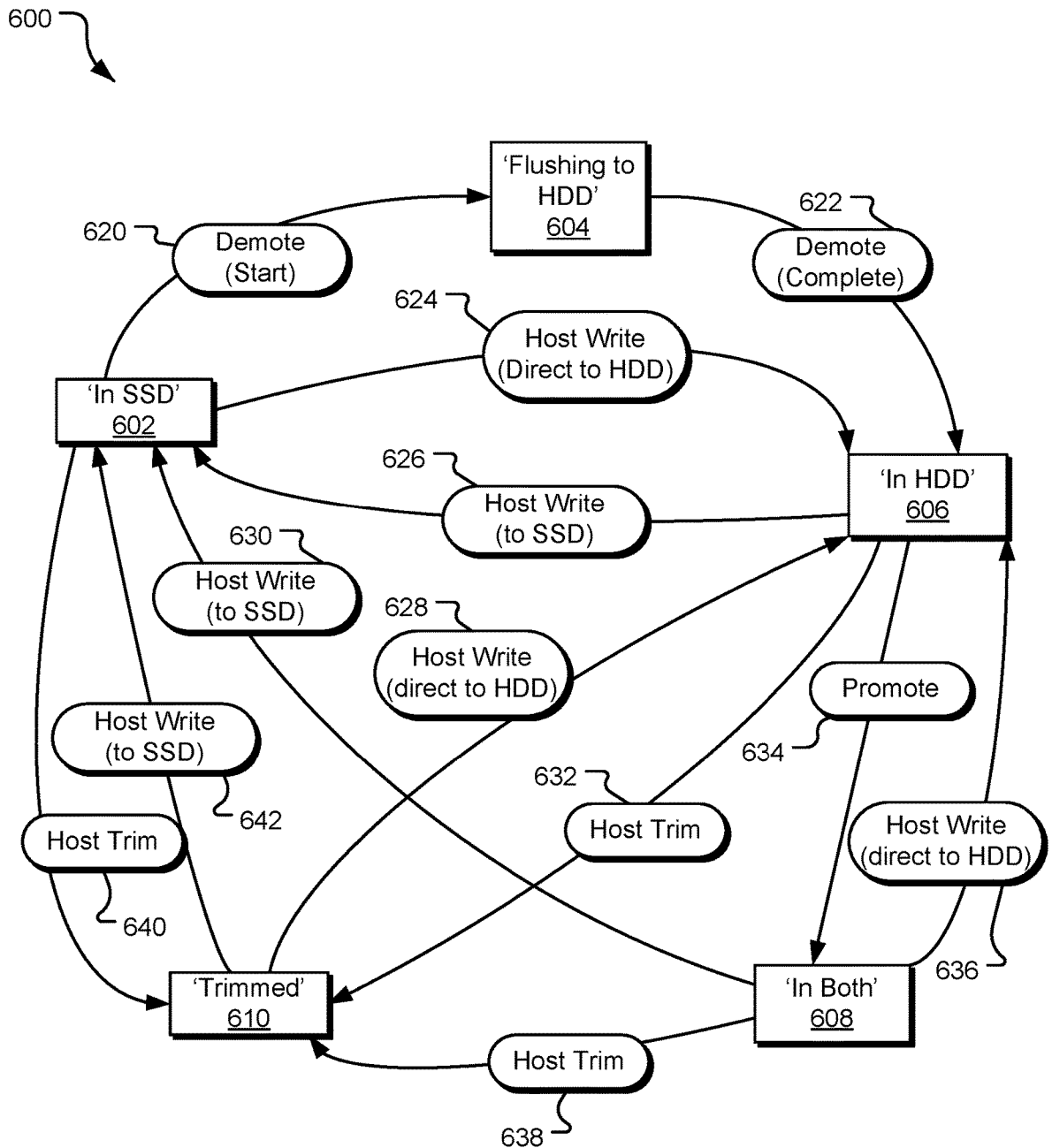
FIG. 6 illustrates an example transition state machine for cache states of a translation layer.

FIG. 6 illustrates an example transition state machine 600 for cache states of a translation layer. The translation layer includes a plurality of entries. Each entry of the plurality of entries is either a leaf entry or a non-leaf entry. Leaf entries include a cache state for data corresponding to logical data unit(s) corresponding to the entry. Thus, the cache states in FIG. 6 represent data corresponding to a logical data unit for an entry. Example cache states are illustrated by the cache states (604-610) and processes for changing states are illustrated by processes (620-640). If an entry has a cache state of 'In SSD' 602, then a demote (start) operation 620 begins demotion of data from the SSD to the HDD. When data is in the process of being demoted, the cache state of the entry corresponding to the data is 'Flushing to HDD' 604. When data has such a state, the data is still serviceable from the SSD. A demote (complete) operation 622 finishes demoting the data. As such, the cache state of the data is changed to 'In HDD' 606. If the entry has a cache state of 'In SSD' 602, and the host initiates a write directly to the HDD, then a host write operation 624 writes the data to the HDD and the cache state is updated to 'In HDD' 606.

If an entry has a cache state of 'In HDD' 606, then data corresponding to the entry is stored in the HDD. A host write (to SSD) operation 626 writes the data from the Host directly to the SSD, and the cache state of the corresponding entry is updated to 'In SSD' 602. If an entry has the cache state of 'In HDD' 606, and the data corresponding to the entry is promoted by a promotion operation 634, then the cache state is updated to 'In Both' 608. In the promote operation 634, the data is copied from the slower access storage media (HDD) to the fast access storage media (SSD). If the entry has a cache state of 'In HDD' 606, and the host initiates a trim (e.g., invalidation) of data, a host trim operation 632 invalidates the data and the cache state of the entry is updated to 'Trimmed' 610.

If an entry has the cache state of 'In Both' 608, and the host initiates a write to the SSD, then a host write (to SSD) operation 630 writes the data to the SSD, and the cache state is updated to 'In SSD' 602. If the entry has the cache state of 'In Both' 608, and the host initiates a trim, then a host trim operation 638 invalidates the data. and the cache state is updated to 'Trimmed' 610. Similarly, if an entry has the cache state of 'In SSD' 602 and the host initiates a trim (invalidation) of the data corresponding to the entry then a host trim operation 640 invalidates the data, and the cache state is updated to 'Trimmed' 610.

If an entry has a cache state of 'Trimmed' 610, and the host initiates a host write to the HDD, then a host write (direct to HDD) operation 628 writes data directly to the HDD, and the cache state is updated to 'In HDD' 606. If the entry has the cache state of 'Trimmed' 610, and the host initiates a write to the SSD, then a host write (to SSD) operation 642, writes data to the SSD, and the cache state is updated to 'In SSD' 602.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term 'memory' means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term 'memory' expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A hybrid drive comprising:
a storage capacity including all available space of a solid-state media and all available space of a hard disc media; and
a translation layer stored in the solid-state media, the translation layer mapping the storage capacity of both the solid-state media and the hard disc media and including a plurality of entries, each entry of the plurality of entries corresponding to at least one logical data unit and including a cache state that indicates a status of data corresponding to the at least one logical data unit, at least one entry of the plurality of entries including a cache state indicating that data corresponding to the at least one entry is located and valid in both the solid-state media and the hard disc media, at least another one entry of the plurality of entries including a cache state indicating that data corresponding to the at least another one entry is located and valid in only the solid-state media, and at least yet another one entry of the plurality of entries including a cache state indicating that data corresponding to the at least yet another one entry is located and valid in only the hard disc media.

2. The hybrid drive of claim 1 wherein a cache state of each of the plurality of entries indicates a location of data corresponding to the at least one logical data unit, the location being one of the hard disc media, the solid-state media, and both the hard disc media and the solid-state media.

3. The hybrid drive of claim 1 wherein the cache state of at least one entry of the plurality of entries indicates data corresponding to the at least one entry is one of trimmed and flushing to the hard disc media.

4. The hybrid drive of claim 1 wherein each entry of the plurality of entries corresponds to a plurality of logical data units, the cache state indicating the status of the data corresponding to the plurality of data units.

5. The hybrid drive of claim 1 wherein the translation layer is a multi-level map, each entry of the plurality of entries corresponding to a plurality of logical data units, the cache state of an entry of the plurality of entries being in the hard disc media and indicating that data corresponding the plurality of logical data units corresponding to the entry is located on the hard disc media.

6. The hybrid drive of claim 1 wherein the translation layer is a multi-level map, each entry of the plurality of entries corresponding to a plurality of logical data units, the cache state of an entry of the plurality of entries being in the solid-state media, the cache state including a pointer to a second level map page stored in the solid-state media, the second level map page including a plurality of second level entries, each second level entry of the plurality of second level entries corresponding to a logical block address of the at least one logical block address.

7. The hybrid drive of claim 6 wherein the second level map page further includes page attributes.

8. The hybrid drive of claim 1 wherein the translation layer is a multi-level map, the multi-level map having a sparse mapping scheme.

9. The hybrid drive of claim 1 wherein the translation layer maps usable space of the solid-state media and the hard drive media.

10. The hybrid drive of claim 1 where in the translation layer is a multi-level map, each entry of the plurality of entries corresponding to a plurality of logical data units, at least one entry of the plurality of entries being a leaf including a cache state that indicates a location of the data corresponding to the plurality of logical data units corresponding the leaf entry, at least one entry of the plurality of entries being a non-leaf entry including a cache state indicating a location of a lower level mapping of the multi-level map.

11. A method comprising:
receiving, at a hybrid drive, a request to read data at a logical address of a storage capacity of the hybrid drive, the storage capacity including all available space of a solid-state media and all available space of a hard disc media, a translation layer being stored in the solid-state media and mapping the storage capacity of both the solid-state media and the hard disc media, the translation layer including a plurality of entries, each entry of the plurality of entries corresponding to at least one logical data unit;
determining a cache state of a logical data unit of the at least one logical data unit, the logical data unit identified using the logical address and being associated with an entry of the plurality of entries, the entry including the cache state, the cache state indicating that data corresponding to the at least one entry is located and valid in both the solid-state media and the hard disc media, a cache state indicating that data corresponding to at least another one entry of the plurality of entries is located and valid in only the solid-state media, and a cache state indicating that data corresponding to at least yet another one entry of the plurality of entries is located and valid in only the hard disc media; and
completing the read request based on the determined cache state.

12. The method of claim 11 wherein a cache state of each of the plurality of entries indicates a location of the data corresponding to the at least one logical data unit, the location being one of the hard disc media, the solid-state media, and both the hard disc media and solid-state media.

13. The method of claim 11 wherein a cache state of at least one other entry of the plurality of entries indicates data corresponding to the at least one other entry is one of trimmed and flushing to the hard disc media.

14. The method of claim 11 wherein the translation layer is a multi-level map, each entry of the plurality of entries corresponds to a plurality of logical data units, the cache state of an entry of the plurality of entries being in the solid-state media, the cache state including a pointer to a second level map page stored in the solid-state media, the second level map page including a plurality of second level entries, each second level entry of the plurality of second level entries corresponding to a logical block address of the at least one logical block address.

15. The method of claim 11 wherein the translation layer is a multi-level map, each entry of the plurality of entries corresponds to a plurality of logical data units, the cache state of an entry of the plurality of entries being in the hard disc media and indicating that data corresponding the plurality of logical data units corresponding to the entry is located on the hard disc media.

16. The method of claim 14 wherein the second level map page further includes page attributes.

17. The method of claim 11 wherein the wherein the translation layer is a multi-level map, the multi-level map utilizing a sparse mapping scheme.

18. One or more processor-readable storage media encoding computer-executable instructions for executing on a computer system a computer process, the computer process comprising:
receiving, at a hybrid drive, a request to read/write data at a logical address of a storage capacity of the hybrid drive, the storage capacity including all available space of a solid-state media, all available space of a hard disc media, and a translation layer being stored in the solid-state media and mapping the storage capacity of both the solid-state media and the hard disc media, the translation layer including a plurality of entries, each entry of the plurality of entries corresponding to at least one logical data unit;
determining a cache state of a logical data unit of the at least one logical data unit, the logical data unit identified using the logical address and being associated with an entry of the plurality of entries, the entry including the cache state, the cache state indicating that data corresponding to the at least one entry is located and valid in both the solid-state media and the hard disc media, a cache state indicating that data corresponding to at least another one entry of the plurality of entries is located and valid in only the solid-state media, and a cache state indicating that data corresponding to at least yet another one entry of the plurality of entries is located and valid in only the hard disc media; and completing the read/write request based on the determined cache state.

19. The one or more processor-readable storage media of claim 18 wherein a cache state of each entry of the plurality of entries indicates a location of the data corresponding to the at least one logical data unit, the location being one of the hard disc media, the solid-state media, and both the hard disc media and solid-state media.

20. The one or more processor-readable storage media of claim 18 wherein the translation layer is a multi-level map, the multi-level map utilizing a sparse mapping scheme.

* * * * *